(No Model.)
W. SMITH.
STUMP EXTRACTOR.
No. 278,620. Patented May 29, 1883.
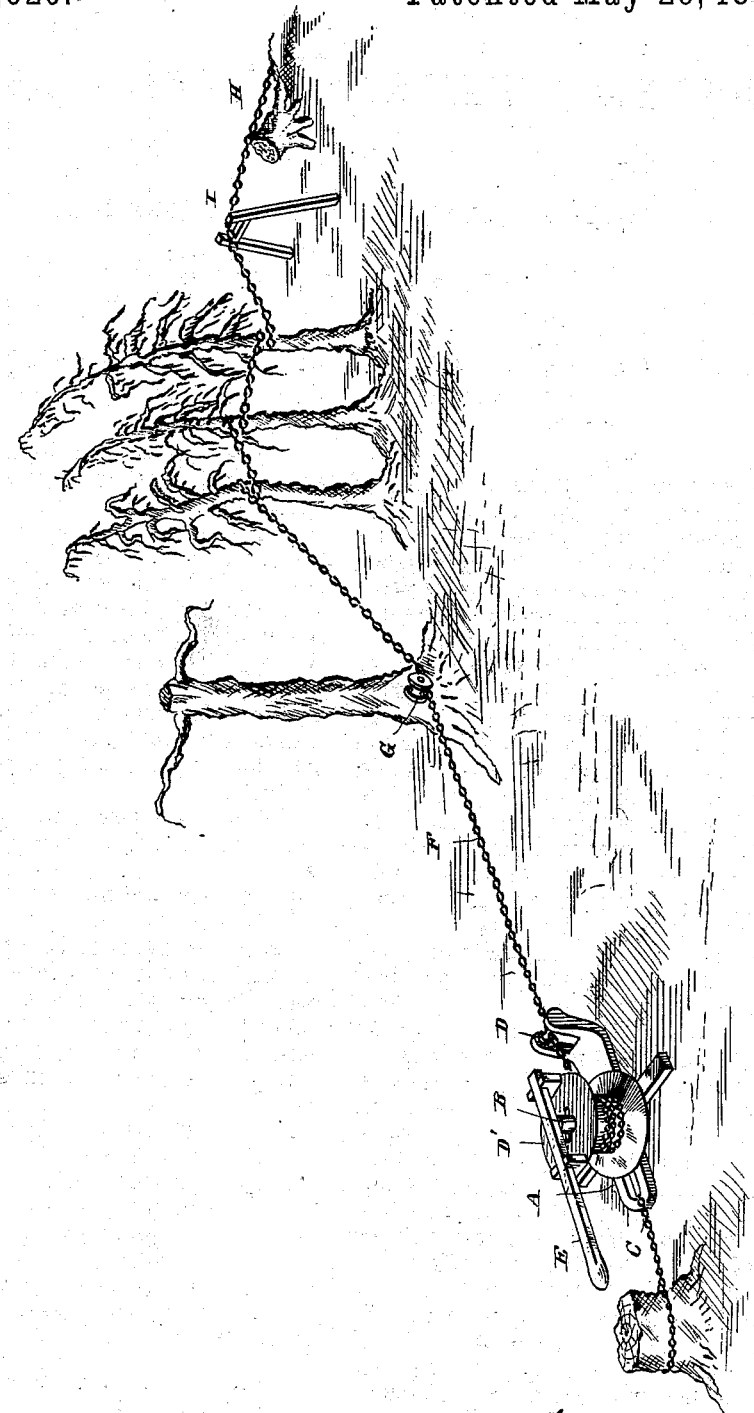

UNITED STATES PATENT OFFICE.

WILLIAM SMITH, OF TOMAH, WISCONSIN.

STUMP-EXTRACTOR.

SPECIFICATION forming part of Letters Patent No. 278,620, dated May 29, 1883.

Application filed February 8, 1883. (No model.)

*To all whom it may concern:*

Be it known that I, WILLIAM SMITH, of Tomah, in the county of Monroe, and in the State of Wisconsin, have invented certain new and useful Improvements in Stump-Extractors; and I do hereby declare that the following is a full, clear, and exact description thereof, reference being had to the accompanying drawing, and to the letters of reference marked thereon, making a part of this specification.

This invention has for its objects to provide a stump-extractor which will be inexpensive in construction, and which will be portable, and may be readily applied and operated, as more fully hereinafter specified. These objects I attain by the means illustrated in the accompanying drawing, in which is represented a perspective view showing my invention and its method of application.

The letter A indicates a strong frame, constructed of suitable material and provided with a pin, B, the lower end of which is secured to said frame rigidly. The frame is cruciform in shape, and is slotted at its rear end, to which is attached a chain, C, by means of which it may be secured against the strain when the machine is in operation. The opposite end of the frame is provided with bearings for the shaft of a pulley, D, for the purpose more fully hereinafter specified. Upon the upper end of the pin B is mounted a rotary drum, D', which is provided with a lever, E, by which it may be turned, the said lever setting in seats between the lugs on the drum. To the said drum is secured one end of a chain, F, which may be carried under the pulley D, and a pulley, G, which may be temporarily secured to a suitable tree, stump, or stake. The other end of the chain, as indicated by the letter K, is secured to the stump to be extracted, the intermediate portions of the chain being secured around the trees, as shown, for the purpose of uprooting them.

The letter I indicates a trestle over which the chain passes before being secured to the stump to be extracted. By cutting the roots at the side of the stump where the end H of the chain is attached, upon the application of the leverage to the drum the trees will be uprooted and the stump extracted. The lateral arms of the cruciform frame prevent the said frame from canting sidewise when the frame is set upon the ground and the apparatus is in operation.

Having thus described my invention, what I claim, and desire to secure by Letters Patent, is—

1. The combination, with the frame adapted to rest upon the ground and to be attached to a suitable stump or stake, of the drum mounted thereon, the operating-lever and the chain secured to the drum at one end, the said chain passing under suitable pulleys, and being secured to the trees to be uprooted and to the stump to be extracted, substantially as specified.

2. In a stump-extractor, the cruciform frame having a slotted rear and a vertical forward extension provided with a pulley under which the draft-chain may pass, and a vertical pin for the winding-drum, substantially as specified.

In testimony whereof I affix my signature, in presence of two witnesses, this 6th day of January, 1883.

WILLIAM SMITH.

Witnesses:
O. J. EATON,
C. EVETT.